(12) United States Patent
Kohno et al.

(10) Patent No.: US 8,695,409 B2
(45) Date of Patent: Apr. 15, 2014

(54) AIR FLOW RATE MEASURING APPARATUS

(75) Inventors: Yasushi Kohno, Obu (JP); Takao Ban, Toyohashi (JP); Hidehito Tsujii, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/596,385

(22) Filed: Aug. 28, 2012

(65) Prior Publication Data

US 2013/0055801 A1 Mar. 7, 2013

(30) Foreign Application Priority Data

Sep. 7, 2011 (JP) ................................. 2011-194846

(51) Int. Cl.
*G01M 15/04* (2006.01)
(52) U.S. Cl.
USPC ................... 73/114.34; 73/114.32; 73/204.23
(58) Field of Classification Search
USPC ........................... 73/114.32, 114.34, 204.23, 73/204.25–204.27
See application file for complete search history.

(56) References Cited

U.S. PATENT DOCUMENTS

| 4,373,383 | A | * | 2/1983 | Plapp et al. | 73/114.34 |
|---|---|---|---|---|---|
| 4,505,248 | A | * | 3/1985 | Yuzawa et al. | 123/519 |
| 4,579,098 | A | * | 4/1986 | Mattes et al. | 123/494 |
| 4,669,306 | A | * | 6/1987 | Akiyama et al. | 73/114.34 |
| 4,741,313 | A | * | 5/1988 | Shimomura | 123/494 |
| 4,756,185 | A | * | 7/1988 | Shimomura | 73/114.34 |
| 4,771,632 | A | * | 9/1988 | Kubo | 73/114.34 |
| 4,846,133 | A | * | 7/1989 | Shiraishi et al. | 123/494 |
| 4,887,462 | A | * | 12/1989 | Gneiss | 73/114.34 |
| 7,739,908 | B2 | * | 6/2010 | Wienand et al. | 73/204.26 |
| 7,878,056 | B2 | * | 2/2011 | Huang et al. | 73/204.26 |
| 8,215,160 | B2 | * | 7/2012 | Saito et al. | 73/114.34 |
| 2006/0144138 | A1 | | 7/2006 | Yamada et al. | |
| 2009/0282909 | A1 | * | 11/2009 | Wienand et al. | 73/204.26 |
| 2011/0072894 | A1 | * | 3/2011 | Saito et al. | 73/114.34 |
| 2013/0105137 | A1 | * | 5/2013 | Kohno et al. | 165/287 |

FOREIGN PATENT DOCUMENTS

| JP | 57-135972 | 8/1982 |
|---|---|---|
| JP | 62-280615 | 12/1987 |
| JP | 63-117219 | 5/1988 |
| JP | 01-169323 | 7/1989 |
| JP | 04-048221 | 2/1992 |
| JP | 4-147016 | 5/1992 |
| JP | 2008-249635 | 10/2008 |

OTHER PUBLICATIONS

Office Action (2 pages) dated Sep. 10, 2013, issued in corresponding Japanese Application No. 2011-194846 and English translation (4 pages).

* cited by examiner

*Primary Examiner* — Freddie Kirkland, III
(74) *Attorney, Agent, or Firm* — Nixon & Vanderhye PC

(57) ABSTRACT

An air flow rate measuring apparatus includes a heater and a control circuit. The heater heats a part of an intake air sucked into an engine. The control circuit controls an energization of the heater. The heater has a measuring-mode temperature when a flow rate of the intake air is measured. The control circuit has a heat cleaner which temporarily raises a temperature of the heater higher than the measuring-mode temperature when an energization of the air flow rate measuring apparatus is started.

14 Claims, 5 Drawing Sheets

AIR FLOW RATE MEASURING APPARATUS

CROSS-REFERENCE TO RELATED APPLICATION

The application is based on Japanese Patent Application No. 2011-194846 filed on Sep. 7, 2011, the disclosure of which is incorporated herein by reference.

TECHNICAL FIELD

The present disclosure relates to an air flow rate measuring apparatus measuring a flow rate of an intake air sucked into an internal combustion engine.

BACKGROUND

JP-56-14116A (U.S. Pat. No. 4,373,383), JP-63-117219A or JP-4-147016A describes an air flow rate measuring apparatus having heat-cleaning function using a heater.

In JP-56-14116A, a heat-cleaning is implemented when an engine is stopped so as not to affect an air-fuel ratio control of the engine. JP-56-14116A requires an external determination circuit in addition to the air flow rate measuring apparatus. The external determination circuit is a trigger circuit which determines whether the heat-cleaning should be implemented or not based on, for example, a start-and-stop number or a temperature of the engine. The heat-cleaning is implemented when an instruction signal for starting the heat-cleaning is sent to the air flow rate measuring apparatus from the external determination circuit.

Further, a dedicated harness is necessary for a connection between the external determination circuit and the air flow rate measuring apparatus. Thus, a cost of the configuration for implementing the heat-cleaning is increased.

Moreover, it is required that an electric power is supplied for a short time to the external determination circuit and the air flow rate measuring apparatus after the engine is stopped. Thus, a cost of the electric power is increased.

Furthermore, the heat-cleaning may be implemented even though a temperature of an intake air is high. If the heat-cleaning is implemented while the temperature of the intake air is high, a temperature of the heater is too much raised and the heater is deteriorated. In this case, a measuring accuracy of an air flow rate is lowered.

In JP-63-117219A, a heat-cleaning is implemented at a fuel-cut time when the engine is decelerated so as not to affect an air-fuel ratio control of the engine.

Because the heat-cleaning is implemented each time when the fuel-cut occurs, a deterioration of the heater is accelerated and a measuring accuracy of the air flow rate is lowered.

In JP-4-147016A, the air flow rate measuring apparatus has a heat-emitting resistor for a heat-cleaning, which is separate from a heater for measuring a flow rate.

Because the resistor is needed additionally to the heater, a configuration of the air flow rate measuring apparatus becomes complicated.

SUMMARY

According to an example of the present disclosure, an air flow rate measuring apparatus includes a heater and a control circuit. The heater heats a part of an intake air sucked into an engine. The control circuit controls an energization of the heater. The heater has a measuring-mode temperature when a flow rate of the intake air is measured. The control circuit has a heat cleaner which temporarily raises a temperature of the heater higher than the measuring-mode temperature when an energization of the air flow rate measuring apparatus is started.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, embodiments of the present disclosure will be described according to the drawings. The following embodiments are specific examples, and the present disclosure is not limited to these embodiments.

(First Embodiment)

A first embodiment will be described with reference to FIGS. 1 to 5.

Figure 1:
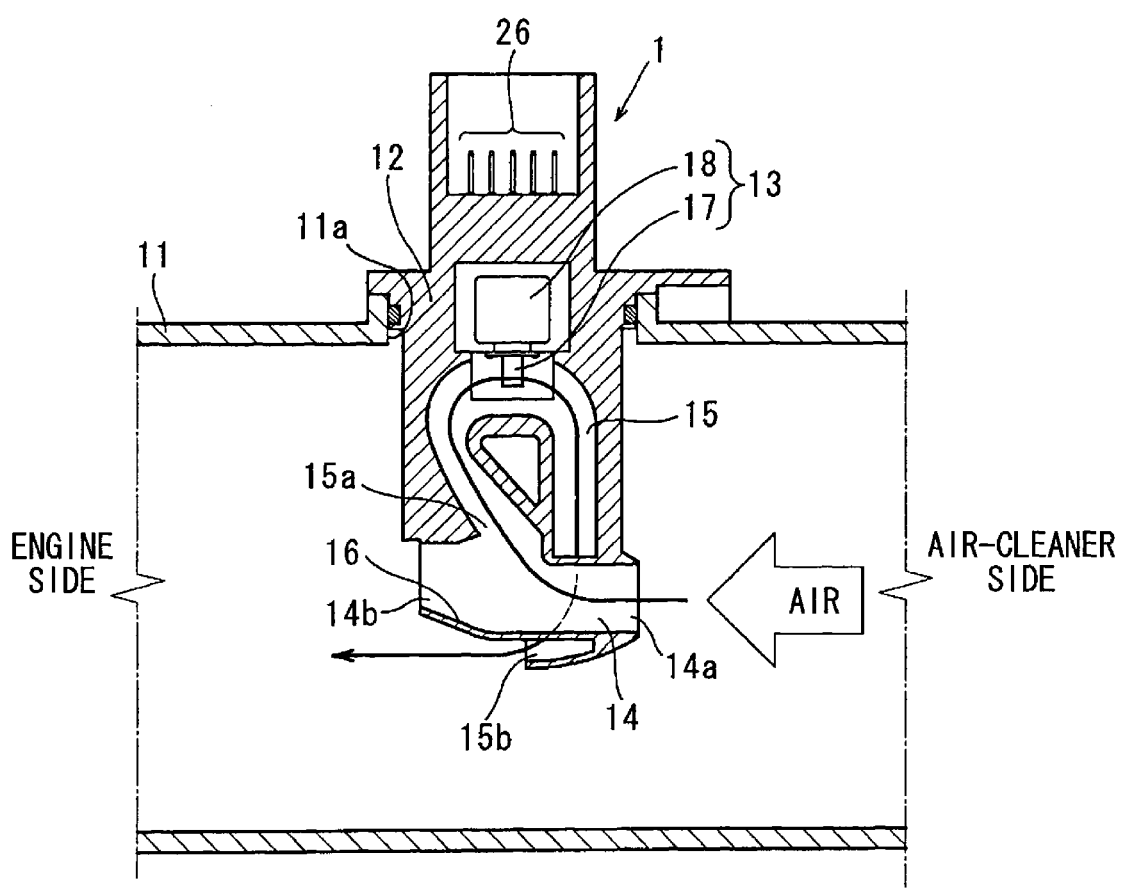
FIG. 1 is a cross-section view illustrating an air flow rate measuring apparatus according to a first embodiment.

As shown in FIG. 1, an air flow rate measuring apparatus 1 is mounted to an intake duct 11 of an engine for a vehicle, and corresponds to a thermal air flow meter (AFM) measuring a flow rate of air (intake air) sucked into the engine.

The air flow rate measuring apparatus 1 includes a passage forming member (housing) 12 assembled to the intake duct 11 and a sensor assy 13 assembled to the passage forming member 12.

The passage forming member 12 is made of a resin material, and is fixed to the intake duct 11 which leads the intake air into the engine. A bypass passage 14 and a sub-bypass passage 15 are defined inside of the passage forming member 12. A part of the intake air flowing through the intake duct 11 (main passage) passes through the bypass passage 14 and the sub-bypass passage 15.

Specifically, the intake duct 11 has an AFM mounting hole 11a penetrating a wall part of the intake duct 11 as a through hole. The passage forming member 12 is inserted into the intake duct 11 through the AFM mounting hole 11a so that the air flow rate measuring apparatus 1 is assembled to the intake duct 11.

The passage forming member 12 has an air inlet 14a as an air inlet of the bypass passage 14 and an air outlet 14b as an air outlet of the bypass passage 14. The passage forming member 12 is placed in a manner that the air inlet 14a faces toward an air cleaner (not shown in FIG. 1) upstream in a flowing direction of air and that the air outlet 14b faces toward the engine (not shown in FIG. 1) downstream in the flowing direction of air. The passage forming member 12 is attached to or detached from the intake duct 11 using a fastening member (not shown) such as a screw.

A part of the air flowing through the intake duct 11 enters the bypass passage 14, and flows approximately along the flowing direction of air in the intake duct 11. The air inlet 14a is provided upstream of the bypass passage 14, and the air outlet 14b is provided downstream of the bypass passage 14 in the air flowing direction. Furthermore, the air outlet 14b has a throttle 16 throttling the air flow flowing through the bypass passage 14.

The sub-bypass passage 15 has an inlet 15a and an outlet 15b. A part of air flowing through the bypass passage 14, that is throttled by the throttle 16, flows into the sub-bypass passage 15 through the inlet 15a, and returns to the intake duct 11 through the outlet 15b. The air flowing from the inlet 15a is rotated in the passage forming member 12 and is returned into the intake duct 11 by the sub-bypass passage 15. Alternatively, the outlet 15b of the sub-bypass passage 15 may be located in the bypass passage 14 so that the air flowing through the sub-bypass passage 15 is returned into the bypass passage 14 again.

As shown in FIG. 1, the sensor assy 13 includes a sensor portion 17 placed to contact the intake air flowing through the sub-bypass passage 15 and a circuit portion 18 fixed to the passage forming member 12.

Figure 2:
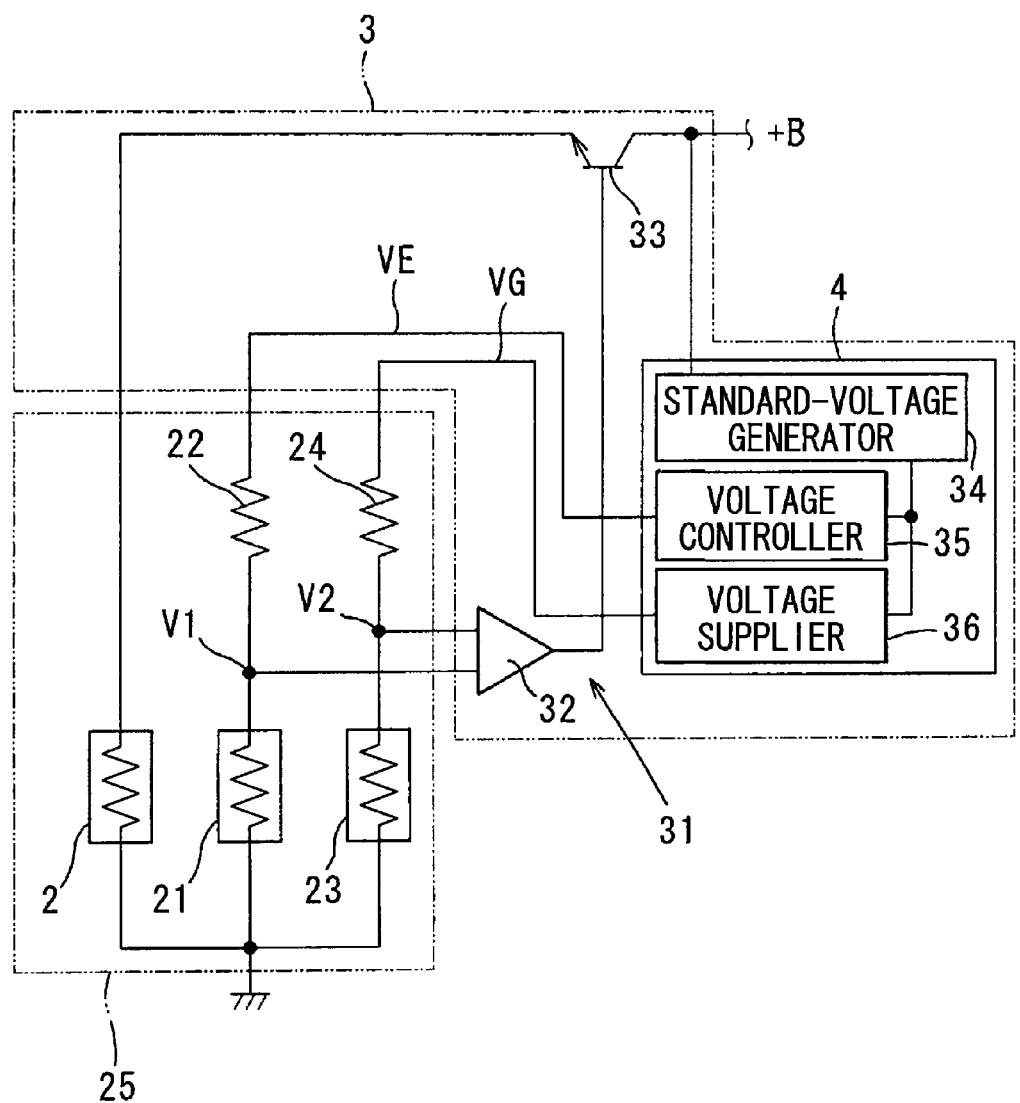
FIG. 2 is an electric circuit diagram of the air flow rate measuring apparatus.

As shown in FIG. 2, the sensor portion 17 includes a heater 2, a heated temperature detecting resistor 21, a heated-side voltage-dividing resistor 22, a non-heated temperature detecting resistor 23, and a non-heated-side voltage-dividing resistor 24. The heater 2 heats air which flows through the sub-bypass passage 15 using heat generated when electric power is supplied to the heater 2.

The heated temperature detecting resistor 21 detects a temperature of the intake air heated by the heater 2. The heated-side voltage-dividing resistor 22 is connected in series with the heated temperature detecting resistor 21, and generates a voltage-dividing value V1 according to the temperature of the intake air heated by the heater 2.

The non-heated temperature detecting resistor 23 detects a temperature of the intake air which is not heated by the heater 2. The non-heated-side voltage-dividing resistor 24 is connected in series with the non-heated temperature detecting resistor 23, and generates a voltage-dividing value V2 according to the temperature of the intake air not heated by the heater 2.

The sensor portion 17 has a temperature detecting resistor for heat-cleaning (not shown), which detects a temperature of the intake air that is not heated by the heater 2. The temperature detecting resistor for heat-cleaning is independent from the non-heated temperature detecting resistor 23, and is provided in a sensor substrate 25 which will be described below, similarly to the non-heated temperature detecting resistor 23.

The sensor portion 17 according to the present embodiment is a chip-type (substrate-type) sensor. The heater 2, the heated temperature detecting resistor 21, the heated-side voltage-dividing resistor 22, the non-heated temperature detecting resistor 23, the non-heated-side voltage-dividing resistor 24, and the temperature detecting resistor for heat-cleaning are provided in the same (single) sensor substrate 25. Alternatively, the sensor portion 17 may be made of a bobbin-type resistor (single-type resistor).

The circuit portion 18 includes a control circuit 3 shown in FIG. 2 inside of the circuit portion 18. The control circuit 3 of FIG. 2 is electrically connected with a connector 26 having plural terminals shown in FIG. 1, and is connected with an exterior member (for example, ECU) through the connector 26.

A housing of the circuit portion 18 of the sensor assy 13 receives the control circuit 3 inside, and is made by a resin material similarly to the passage forming member 12. The housing of the circuit portion 18 is assembled to the passage forming member 12 in a manner that the sensor portion 17 of the sensor assy 13 is placed at a U-turn portion of the sub-bypass passage 15.

The sensor assy 13 may be fixed on the passage forming member 12 by an adhesive or welding, or the sensor assy 13 may be attached to or detached from the passage forming member 12 by a fastening member such as a screw.

The control circuit 3 has a temperature-difference holder 31 (Wheatstone bridge circuit). As shown in FIG. 2, the Wheatstone bridge circuit is constructed by the heated temperature detecting resistor 21, the heated-side voltage-dividing resistor 22, the non-heated temperature detecting resistor 23, and the non-heated-side voltage-dividing resistor 24, in the sensor portion 17.

The control circuit 3 includes an operational amplifier (comparator) 32, and a power transistor (amplifying element) 33. The voltage-dividing value V1 according to the temperature of the intake air heated by the heater 2 is obtained by a voltage-dividing of the heated temperature detecting resistor 21 and the heated-side voltage-dividing resistor 22. The voltage-dividing value V2 according to the temperature of the intake air not heated by the heater 2 is obtained by a voltage-dividing of the non-heated temperature detecting resistor 23 and the non-heated-side voltage-dividing resistor 24.

The operational amplifier 32 generates an output according to a voltage difference between the voltage-dividing value V1 and the voltage-dividing value V2. The power transistor 33 applies a current according to the output of the operational amplifier 32 to the heater 2.

The operational amplifier 32 and the power transistor 33 control an energization of the heater 2 so that a difference between the temperature of the intake air heated by the heater 2 (the voltage-dividing value V1) detected by the heated temperature detecting resistor 21 and the temperature of the intake air not heated by the heater 2 (the voltage-dividing value V2) detected by the non-heated temperature detecting resistor 23 becomes a predetermined fixed value (voltage). In an ordinary mode (a flow rate measuring mode), the flow rate of the intake air is measured according to a current value applied to the heater 2, because the current value is varied in accordance with the air flow rate.

The control circuit 3 further has a heat cleaner 4, which raises the temperature of the heater 2 higher than a temperature of the ordinary mode (the air flow rate measuring mode) temporarily when an energization of the air flow rate measuring apparatus 1 is started, for example, through the connector 26. The energization of the air flow rate measuring apparatus 1 is determined to be started, for example when a key-switch of the engine is turned on to start the engine.

In a case where an energization of the air flow rate measuring apparatus 1 is started, the heat cleaner 4 raises the temperature of the heater 2 from the measuring-mode temperature (dashed line AA in FIG. 3B) to the cleaning-mode temperature (solid line CC1 in FIG. 3B) temporarily based on the temperature of the intake air detected by the temperature detecting resistor for heat-cleaning. The cleaning-mode temperature corresponds to a target temperature of the heat-cleaning such as 310° C. As shown in FIG. 3B, when the air flow rate measuring apparatus 1 is energized, the temperature of the heater 2 is set into the target temperature (CC1) which is higher than the ordinary-mode temperature (AA).

The heat cleaner 4 implements the heat-cleaning by changing at least one of the voltage-dividing value V1 corresponding to the heated air and the voltage-dividing value V2 corresponding to the non-heated air, so as to raise the temperature of the heater 2 higher than the temperature of the air flow rate measuring mode.

Specifically, as shown in FIG. 2, the heat cleaner 4 of the control circuit 3 has a standard-voltage generator 34 (voltage regulator), a voltage controller 35, and a voltage supplier 36. The standard-voltage generator 34 generates a fixed standard voltage by controlling a power voltage (+B in FIG. 2) supplied from outside of the air flow rate measuring apparatus 1 to the control circuit 3.

In the ordinary mode (the flow rate measuring mode), the voltage controller 35 supplies a voltage VE to the heated-side voltage-dividing resistor 22 for generating a voltage-dividing value V1 according to the temperature of a heated intake air. In contrast, in the heat-cleaning mode, the voltage controller 35 controls the voltage VE supplied to the heated-side voltage-dividing resistor 22 for raising the temperature of the heater 2 higher than the temperature of the ordinary mode (for changing the voltage-dividing value V1).

The voltage supplier 36 supplies a voltage VG to the non-heated-side voltage-dividing resistor 24 for generating a voltage-dividing value V2 according to the temperature of a non-heated intake air, both in the ordinary mode and the heat-cleaning mode.

The temperature of the heater 2 is raised to the target temperature such as 310° C. based on the intake air temperature, for example, as follows.

The voltage controller 35 calculates a raising value in the temperature of the heater 2 (VE_CTL_PWup) using the following linear approximate equation (1).

$$VE\_CTL\_PWup = (\text{intake air temperature}) \times \text{gain} + (\text{offset value}) \quad (1)$$

Figure 3A:
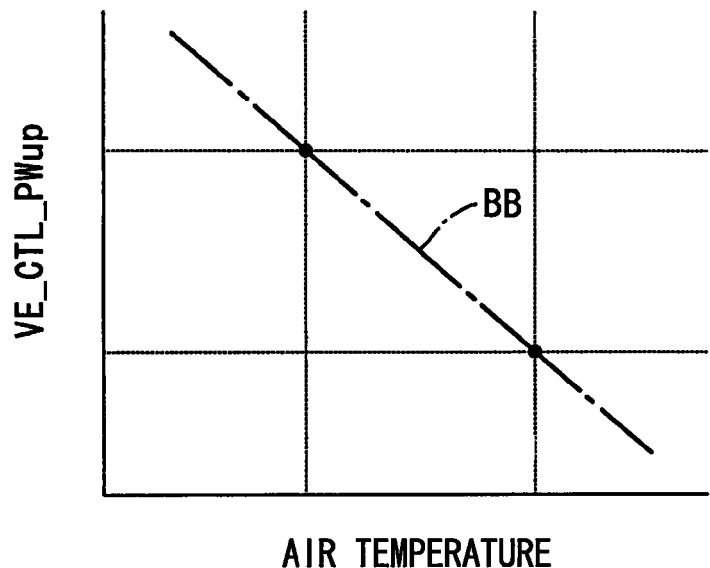
FIG. 3A is a graph illustrating a relationship between an air temperature and a raising value in a temperature of a heater in the air flow rate measuring apparatus.
Figure 3B:
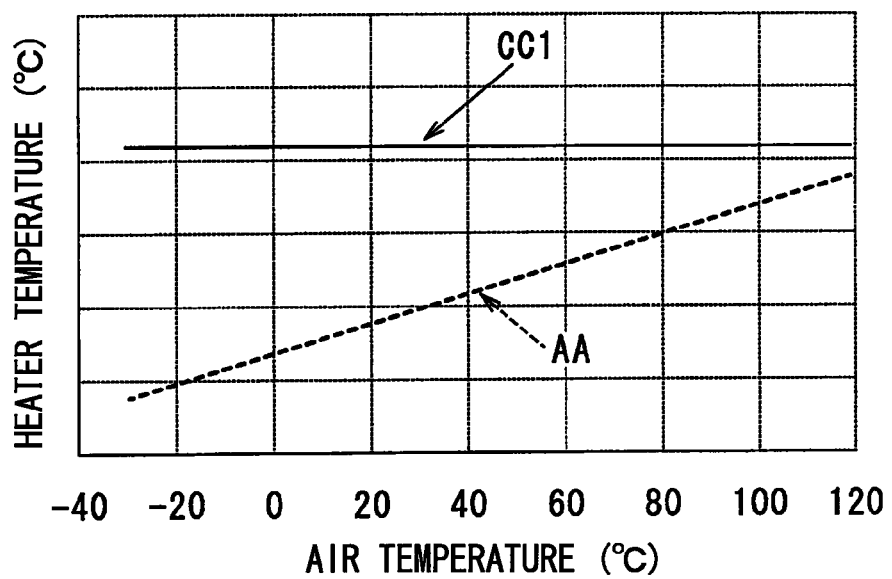
FIG. 3B is a graph illustrating a relationship between an air temperature and a temperature of a heater in the air flow rate measuring apparatus.

In FIG. 3A, the vertical axis corresponds to the raising value in the temperature of the heater 2 (VE_CTL_PWup), and a single-chained line BB represents a relationship between the raising value in the temperature of the heater 2 (VE_CTL_PWup) and the temperature of intake air.

The voltage controller 35 calculates an adjusting temperature by subtracting the raising value in the temperature of the heater 2 (VE_CTL_PWup) from a temperature (VE_CTL) of the heater 2 in the ordinary mode (the flow rate measuring mode), and variably controls the voltage VE using the adjusting temperature.

Thus, when the heat-cleaning is implemented, the voltage controller 35 variably controls the voltage VE in accordance with the intake air temperature, thereby controlling the heater 2 to have the substantially fixed heat-cleaning target temperature such as 310° C. even when the intake air temperature is varied, as shown in the solid line CC1 of FIG. 3B.

Hereafter, an implementation time of the heat-cleaning by the heat cleaner 4 will be described. The implementation time of the heat-cleaning represents a heat-cleaning time period during which the heat-cleaning is implemented for raising the temperature of the heater 2 higher than the temperature of the air flow rate measuring mode.

The voltage controller 35 has a timer such as a capacitor, which determines the heat-cleaning time period when the heat-cleaning is implemented.

In the first embodiment in which the sensor portion 17 is made of the chip-type sensor, the heat-cleaning time period is set to be equal to or larger than 0.2 second and to be equal to or smaller than 2 seconds. It is more preferable that the heat-cleaning time period is set to be equal to or larger than 0.5 second and to be equal to or smaller than 1 second. Hereafter, a specific example, in which the heat-cleaning time period is set as 0.5 second, will be described. However, the heat-cleaning time period is not limited to the specific example.

Figure 4:
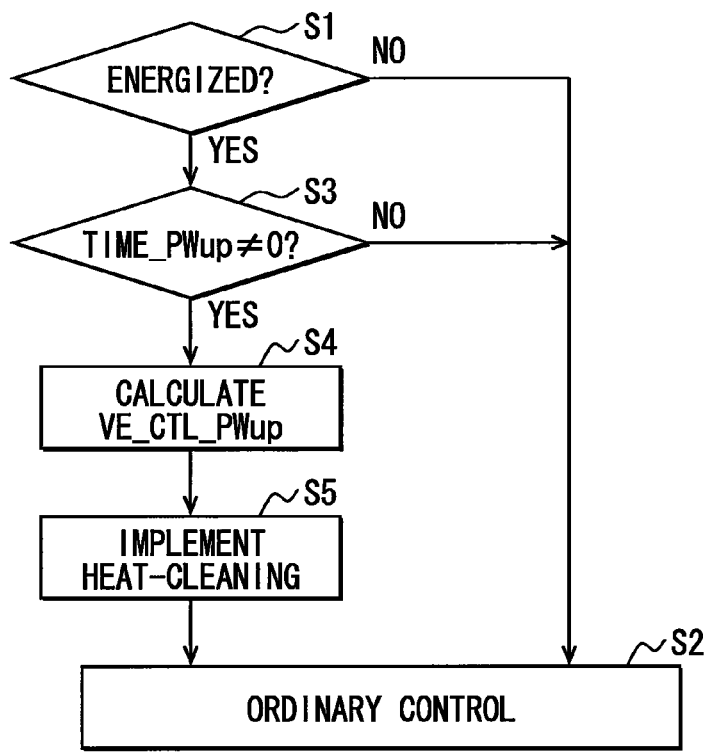
FIG. 4 is a flowchart illustrating a control processed by a heat cleaner of the air flow rate measuring apparatus.
Figure 5:
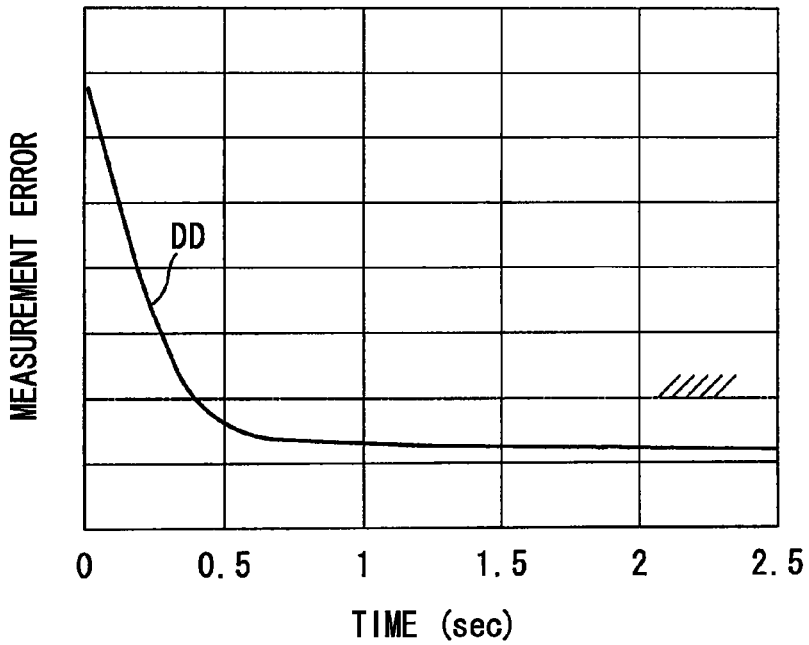
FIG. 5 is a graph illustrating a relationship between a time of energizing a heater and a measurement error when a heat-cleaning is implemented by the air flow rate measuring apparatus.

Hereafter, a control procedure (operation) of the heat cleaner 4 will be described according to the flowchart of FIG. 4. The heat cleaner 4 may be configured by a logical circuit (not with micro-computers), or may be implemented by a control program using a micro-computer.

In S1, an energization of the air flow rate measuring apparatus 1 is determined whether to be started or not. When the air flow rate measuring apparatus 1 is not energized, the procedure proceeds to S2. In S2, the heat-cleaning is not implemented and an ordinary control (an intake air flow rate measuring) is implemented.

When the air flow rate measuring apparatus 1 is determined to be energized, the procedure proceeds to S3, in which the heat-cleaning time period TIME_PWup is determined to be set as not zero (TIME_Pwup≠0).

When the heat-cleaning time period TIME_PWup is zero, the procedure proceeds to S2 (ordinary control) in which the heat-cleaning is not implemented and the flow rate will be measured.

When the heat-cleaning time period TIME_PWup is not zero, the procedure proceeds to S4, in which the raising value in the temperature of the heater 2 (VE_CTL_PWup) is calculated by the above equation (1).

In S5 after S4, the voltage VE is variably controlled using the above-described adjusting temperature which is calculated by subtracting the raising value in the temperature of the heater 2 (VE_CTL_PWup) from the temperature of the heater 2 (VE_CTL), for the heat-cleaning time period such as 0.5 second. Due to S5, the heat-cleaning, which raises the temperature of the heater 2 to the target temperature, is implemented for the heat-cleaning time period. After the heat-cleaning time period elapses in S5, the procedure proceeds to S2 (ordinary control) and the flow rate will be measured.

According to the first embodiment, when the air flow rate measuring apparatus 1 is energized from the external power source, the heat cleaner 4 of the control circuit 3 implements the heat-cleaning which raises the temperature of the heater 2 higher than the temperature of the air flow rate measuring mode for the heat-cleaning time period (an example of "temporarily").

Further, the control circuit 3, which is provided in the air flow rate measuring apparatus 1, implements the heat-cleaning when the air flow rate measuring apparatus 1 is energized, therefore a dedicated harness and an external determination circuit which instructs the heat-cleaning are unnecessary, and then a configuration cost of the air flow rate measuring apparatus 1 for implementing the heat-cleaning can be reduced.

Furthermore, the heat-cleaning is implemented when the air flow rate measuring apparatus 1 is energized, therefore it becomes unnecessary to continue energizing the air flow rate measuring apparatus 1 after the engine is stopped, and then a cost of electric power supplied to the air flow rate measuring apparatus 1 can be reduced.

According to the first embodiment, when the heat-cleaning is implemented, the air flow rate measuring apparatus 1 raises the temperature of the heater 2 to a substantially fixed heat-cleaning target temperature based on the intake air temperature.

Therefore, even if the heat-cleaning is implemented when the intake air temperature is high, the temperature of the heater 2 can be restricted from being raised too much high, therefore a deterioration of the heater 2 can be avoided, and a deterioration of the measuring accuracy of the intake air flow rate caused by the deterioration of the heater 2 can be avoided. That is, a reliable air flow rate measuring apparatus 1 can be provided.

According to the first embodiment, the heat-cleaning time period is set to be equal to or larger than 0.2 second and to be equal to or smaller than 2 seconds in the air flow rate measuring apparatus 1.

When the heat-cleaning time period is set larger than 0.2 second, an impurity removal is implemented efficiently by heat emitted from the heater 2. Thus, as shown in a solid line DD of FIG. 5, a measurement accuracy of the air flow rate can be maintained as high by removing the impurity.

If the heat-cleaning time period is too much long, the engine control may be affected because it becomes difficult to measure the flow rate. Therefore, the heat-cleaning time period is set smaller than 2 seconds, and the measuring result of intake air flow rate is used for the engine control. The flow rate measuring is less affected after a complete combustion in the engine, and a deterioration of the heater 2 can be reduced.

The heat-cleaning time period may be set to be equal to or larger than 0.5 second and equal to or smaller than 1 second. As shown in the solid line DD of FIG. 5, when the heat-cleaning time period is set larger than 0.5 second, the impurity removal is certainly implemented by the heat emitted from the heater 2. Thus, the measurement accuracy of the air flow rate can be maintained as high.

When the heat-cleaning time period is set smaller than 1 second, the intake air flow rate can be suitably measured for the engine control and the deterioration of the heater 2 can be certainly reduced.

Furthermore, the heat-cleaning time period may be set as 0.5 second. When the heat-cleaning time period is set as 0.5 second, the impurity can be efficiency removed by the heat emitted from the heater 2 and the intake air flow rate measuring which is used in the engine control can be less affected.

According to the first embodiment, the temperature detecting resistor for heat-cleaning is provided in the sensor substrate 25 which is the same substrate on which the heater 2 is provided. Therefore, a cost of adding the temperature detecting resistor for heat-cleaning can be reduced, and a cost of the air flow rate measuring apparatus 1 can be restricted from increasing.

According to the first embodiment, the air flow rate measuring apparatus 1 implements the heat-cleaning by changing the voltage-dividing value V1 according to the heated intake air temperature, specifically by changing the voltage VE, which is detected by the heated temperature detecting resistor 21.

Therefore, another circuit for implementing the heat-cleaning is unnecessary, and the cost of the air flow rate measuring apparatus 1 implementing the heat-cleaning can be reduced.

(Second Embodiment)

The second embodiment will be described according to FIGS. 6 and 7. The same reference numeral indicates the same component as the first embodiment.

In the first embodiment, as shown in FIG. 3B, the heat cleaner 4 controls the heater 2 to have the substantially fixed temperature CC1 so that the temperature of the heater 2 is constant in the heat-cleaning mode regardless of the intake air temperature.

Figure 6:
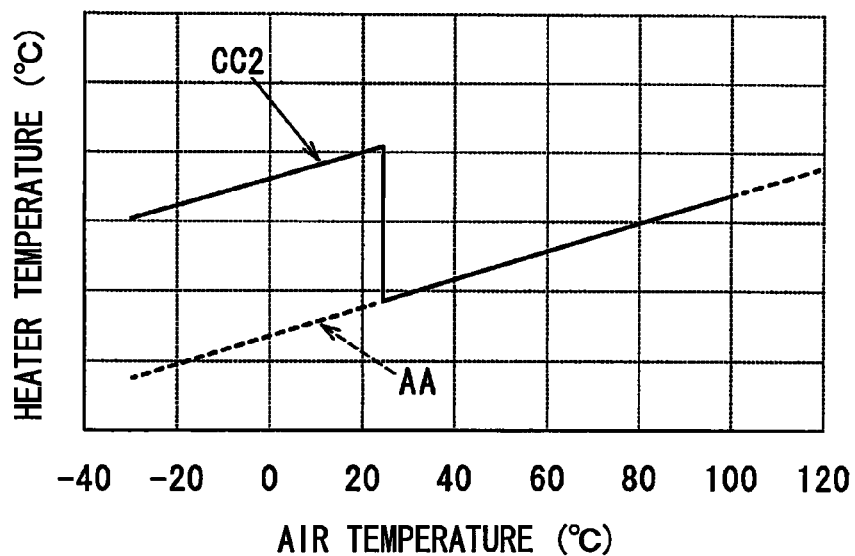
FIG. 6 is a graph illustrating a relationship between an air temperature and a temperature of a heater in an air flow rate measuring apparatus according to a second embodiment.

Compared to the first embodiment, in the second embodiment, as shown in FIG. 6, the heat cleaner 4 raises the temperature of the heater 2 to a target value CC2, which is higher than the ordinary mode temperature AA temporarily when the intake air temperature detected by the temperature detecting resistor for heat-cleaning is lower than a predetermined heat-cleaning start temperature such as 25° C. and when the energization of the air flow rate measuring apparatus 1 is started.

The heat cleaner 4 of the second embodiment, which has the same configuration as the first embodiment, raises the temperature of the heater 2 higher than the temperature of the air flow rate measuring mode by changing at least one of the voltage-dividing value V1 and the voltage-dividing value V2.

In the second embodiment, when a condition for starting the heat-cleaning is satisfied (when the intake air temperature is equal to or lower than 20° C. and when the energization is started), the voltage controller 35 variably controls the voltage VE temporarily (for example, during the heat-cleaning time period according to the first embodiment) using an adjusting temperature which is calculated by subtracting a predetermined value from the temperature of the heater 2 (VE_CTL) of the ordinary mode.

Therefore, as shown in FIG. 6, when the condition for starting the heat-cleaning is satisfied, the voltage controller 35 temporarily raises the temperature of the heater 2 to the target value CC2, which is higher than the ordinary-mode temperature AA.

According to the second embodiment, the air flow rate measuring apparatus 1 implements the heat-cleaning when the intake air temperature is equal to or lower than the heat-cleaning start temperature such as 20° C. (or 25° C.).

When the intake air temperature is higher than 20° C., the heat-cleaning is not implemented, as clearly shown in FIG. 6. Therefore a deterioration of the heater 2 can be avoided. Thus, a deterioration of the measurement accuracy of the intake air flow rate can be avoided, and the reliability of the air flow rate measuring apparatus 1 can be improved.

According to the second embodiment, the heat-cleaning start temperature is set to be equal to or lower than 20° C.

Figure 7:
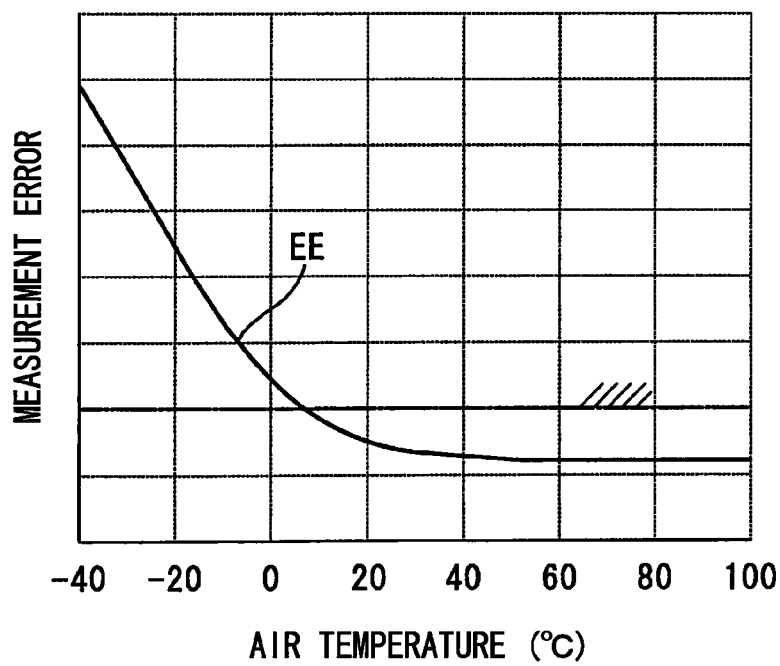
FIG. 7 is a graph illustrating a relationship between an air temperature and a measurement error when a heat-cleaning is implemented by the air flow rate measuring apparatus of the second embodiment.

As shown in a solid line EE of FIG. 7, even though the heat-cleaning is not implemented when the intake air temperature is higher than 20° C., since the impurity removal is implemented by the heat emitted from the heater 2 in the ordinary mode (air flow rate measuring mode), a deterioration of an air flow rate measuring accuracy caused by impurity adherence can be avoided.

According to the second embodiment, similarly to the first embodiment, the air flow rate measuring apparatus 1 implements the heat-cleaning by changing the voltage-dividing value V1 corresponding to the heated intake air temperature, specifically by changing the voltage VE, which is detected by the heated temperature detecting resistor 21.

Therefore, another circuit for implementing the heat-cleaning is unnecessary, and the cost of the air flow rate measuring apparatus 1 implementing the heat-cleaning can be reduced.

In the embodiments above, the heat-cleaning time period is set as a substantially fixed value. However, the heat-cleaning time period may be continuously or stepwisely changed according to the operation conditions of the engine such as intake air temperature.

Numerical values (for example, the heat-cleaning target temperature is 310° C.), which are indicated in the embodiments above, are for understanding and are not limited.

In the embodiments above, the temperature detecting resistor for heat-cleaning (not shown) and the non-heated temperature detecting resistor 23 are provided independently. However, the both of them may be provided as one common resistor.

The first embodiment and the second embodiment may be combined with each other. That is, the temperature of the heater 2 is raised to a predetermined fixed heat-cleaning target temperature (according to the first embodiment) when the intake air temperature is lower than a predetermined temperature (according to the second embodiment).

In the embodiments above, two air passages (the bypass passage 14 and the sub-bypass passage 15) are defined inside of the passage forming member 12 in the air flow rate measuring apparatus 1. However, only one air passage (an intake air flow rate measuring passage) may be defined inside of the passage forming member 12 in the air flow rate measuring apparatus 1.

In the embodiments above, the flowing direction of the air flowing through the sensor portion 17 is opposite to the flowing direction of the air flowing through the intake duct 11. The flowing direction of the air flowing through the sensor portion 17 is not limited, and may be along or perpendicular to the flowing direction of the air flowing through the intake duct 11.

Such changes and modifications are to be understood as being within the scope of the present disclosure as defined by the appended claims.

What is claimed is:

1. An air flow rate measuring apparatus comprising:
    a heater heating a part of an intake air sucked into an engine; and
    a control circuit controlling an energization of the heater, wherein
    the heater has a measuring-mode temperature when a flow rate of the intake air is measured, and
    the control circuit has a heat cleaner which temporarily raises a temperature of the heater higher than the measuring-mode temperature when an energization of the air flow rate measuring apparatus is started.

2. An air flow rate measuring apparatus according to claim 1, wherein
    the heat cleaner of the control circuit temporarily raises the temperature of the heater higher than the measuring-mode temperature to have a predetermined target temperature, regardless of a temperature of the intake air, when the energization of the air flow rate measuring apparatus is started.

3. An air flow rate measuring apparatus according to claim 1, further comprising:
    a first resistor detecting a temperature of the intake air that is not heated by the heater, wherein
    the heat cleaner of the control circuit temporarily raises the temperature of the heater higher than the measuring-mode temperature to have a predetermined target temperature, based on the temperature of the intake air detected by the first resistor, when the energization of the air flow rate measuring apparatus is started.

4. An air flow rate measuring apparatus according to claim 3, further comprising:
    sensor substrate on which the heater is arranged, wherein
    the first resistor is arranged on the sensor substrate.

5. An air flow rate measuring apparatus according to claim 1, further comprising:
    a first resistor detecting a temperature of the intake air, wherein
    the heat cleaner of the control circuit temporarily raises the temperature of the heater higher than the measuring-mode temperature, when the temperature of the intake air detected by the first resistor is equal to or lower than a predetermined heat-cleaning start temperature and when the energization of the air flow rate measuring apparatus is started.

6. An air flow rate measuring apparatus according to claim 5, wherein the heat-cleaning start temperature is equal to or lower than 20° C.

7. An air flow rate measuring apparatus according to claim 1, wherein
    the heat cleaner of the control circuit temporarily raises the temperature of the heater higher than the measuring-mode temperature for a heat-cleaning time period, and
    the heat-cleaning time period is in a range that is equal to or larger than 0.2 second and that is equal to or smaller than 2 seconds.

8. An air flow rate measuring apparatus according to claim 1, further comprising:
    a first resistor detecting a first temperature of the intake air that is not heated by the heater; and
    a second resistor detecting a second temperature of the intake air that is heated by the heater, wherein
    the control circuit further includes a temperature-difference holder controlling the energization of the heater so that a temperature difference between the first temperature and the second temperature becomes a predetermined fixed value,
    the temperature-difference holder has a Wheatstone bridge circuit constructed by the first resistor and the second resistor, and
    the heat cleaner of the control circuit temporarily raises the temperature of the heater higher than the measuring-mode temperature by changing a balance of the Wheatstone bridge circuit of the temperature-difference holder, when the energization of the air flow rate measuring apparatus is started.

9. An air flow rate measuring apparatus according to claim 8, wherein
    the balance of the Wheatstone bridge circuit of the temperature-difference holder is changed by changing at least one of a voltage applied to the first resistor and a voltage applied to the second resistor so as to raise the temperature of the heater higher than the measuring-mode temperature.

10. An air flow rate measuring apparatus according to claim 1, wherein the intake air is introduced into the engine by flowing inside of an intake duct, the air flow rate measuring apparatus further comprising:
    a bypass passage bypassing the intake duct, a part of the intake air introduced into the intake duct flowing through the bypass passage; and
    a sub-bypass passage, a part of the intake air introduced into the bypass passage flowing through the sub-bypass passage, wherein the flow rate of the intake air is measured by measuring a flow rate of air passing through the sub-bypass passage.

11. An air flow rate measuring apparatus according to claim 1, wherein
    the heat cleaner temporarily raises the temperature of the heater higher than the measuring-mode temperature when an ignition switch of the engine is turned on.

12. An air flow rate measuring apparatus according to claim 1, wherein
    the energization of the air flow rate measuring apparatus is started when an ignition switch of the engine is turned on to start the engine.

13. An air flow rate measuring apparatus according to claim 1, wherein
   the energization of the air flow rate measuring apparatus is started when the engine is started.

14. An air flow rate measuring apparatus according to claim 1, wherein
   the energization of the air flow rate measuring apparatus is discontinued after the engine is stopped.

\* \* \* \* \*